United States Patent [19]
// Martner
[11] Patent Number: 4,682,187
[45] Date of Patent: * Jul. 21, 1987

[54] INK JET METHOD AND APPARATUS UTILIZING GRANDULAR OR HOT MELT INK

[76] Inventor: John G. Martner, P.O. Box 292, Brookfield, Conn. 06804

[ * ] Notice: The portion of the term of this patent subsequent to Sep. 3, 2002 has been disclaimed.

[21] Appl. No.: 669,579

[22] Filed: Nov. 8, 1984

[51] Int. Cl.⁴ .............................................. G01D 15/16
[52] U.S. Cl. ................................ 346/140 R; 222/185
[58] Field of Search .................... 346/140 PD, 140 R; 222/67, 196, 185

[56] References Cited

U.S. PATENT DOCUMENTS

| | | | |
|---|---|---|---|
| 2,620,097 | 12/1952 | Titmas | 222/67 |
| 3,270,921 | 12/1963 | Nadolske | 222/185 |
| 3,637,115 | 1/1972 | Holm | 222/196 |
| 3,717,286 | 2/1973 | Crider | 222/185 |
| 4,539,568 | 9/1985 | Lewis | 346/140 PD |

*Primary Examiner*—E. A. Goldberg
*Assistant Examiner*—Mark Reinhart

[57] ABSTRACT

Hot melt ink is delivered in particle form to a melting area. The particles are fluidized and then advanced under the influence of gravity. A float valve responsive to the level of melted ink in the melting area restricts the flow of ink particles to the melting area.

17 Claims, 7 Drawing Figures

INK JET METHOD AND APPARATUS UTILIZING GRANDULAR OR HOT MELT INK

BACKGROUND OF THE INVENTION

This invention relates to an ink jet wherein the ink employed within the jet is of the phase change type, which may be referred to as hot melt ink.

Phase change or hot melt ink of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984, which is assigned to the assignee of this invention. The hot melt ink may be jetted from a variety of apparatus including those disclosed in the aforesaid copending application.

A variety of techniques have been suggested for delivery of hot melt ink in a solid state to an ink jet apparatus. Copending application Ser. No. 660,656, filed 10/15/84, discloses the delivery of hot melt ink in granular form to a heated reservoir. The ink is then melted and supplied to one or more ink jets. The ink in granular form is delivered by means of an auger-like member, which advances the hot melt ink to a discharge position into the heated reservoir.

SUMMARY OF THE INVENTION

It is an object of this invention to deliver hot melt ink in granular or particle form without requiring an elaborate ink delivery system.

It is a still further object of this invention to provide for a cost effective means for supplying hot melt ink in granular form.

It is a further object of this invention to provide for the delivery of hot melt ink in particle or granular form in small quantities.

It is a further object of this invention to provide for the delivery of hot melt ink in granular form in a manner so as to prevent continuous heating of a large volume of ink.

In accordance with these and other objects of the invention, an ink jet apparatus comprising an ink jet chamber including an inlet and orifice for ejecting droplets of ink is supplied with hot melt ink in particle form. The particles of hot melt ink are fluidized (i.e., induced into a flowing movement as a whole) by vibrating a bin containing the particles. The fluidized particles move to an outlet of the bin before moving to a melting area where the ink is melted and supplied to the inlet to the chamber.

In a preferred embodiment of the invention, the bin includes at least one inclined surface leading to the outlet such that the fluidized particles proceed downwardly under the influence of gravity to the outlet. Preferably, the outlet is located at the base of the bin. The flow of ink particles from the outlet is controlled by a float valve which moves upwardly and downwardly with the level of melted ink so as to permit the introduction of particles of ink into the melting area in response to the level of float valve. Preferably, guide means are provided for controlling the path of the float valve as it moves into and out of engagement with the outlet from the bin.

DETAILED DESCRIPTION OF A PREFERRED EMBODIMENT

Figure 1:
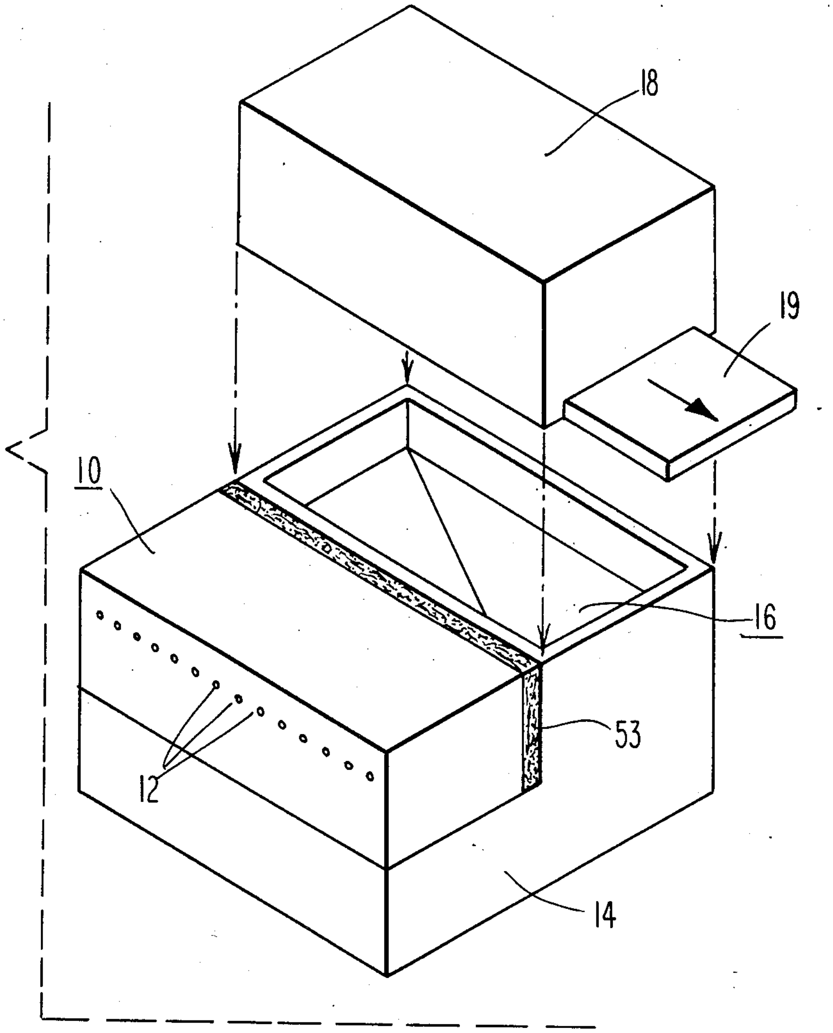
FIG. 1 is a perspective view of an ink jet apparatus embodying the invention.

Referring to FIG. 1, an ink jet apparatus comprises a printhead 10 including a plurality of ink jets 12 including chambers having droplet ejection orifices. The printhead 10 is supplied with hot melt ink from a sump or heated reservoir 14 which is supplied with hot melt ink in granular or particle form which enters a storage bin 16. The ink in granular form may be supplied by a cartridge 18 having a sliding plate 19. When the sliding plate 19 is moved in a track to the position shown, the bottom of the cartridge 18 opens up so as to drop the ink in particle or granular form into the bin 16.

Figure 2:
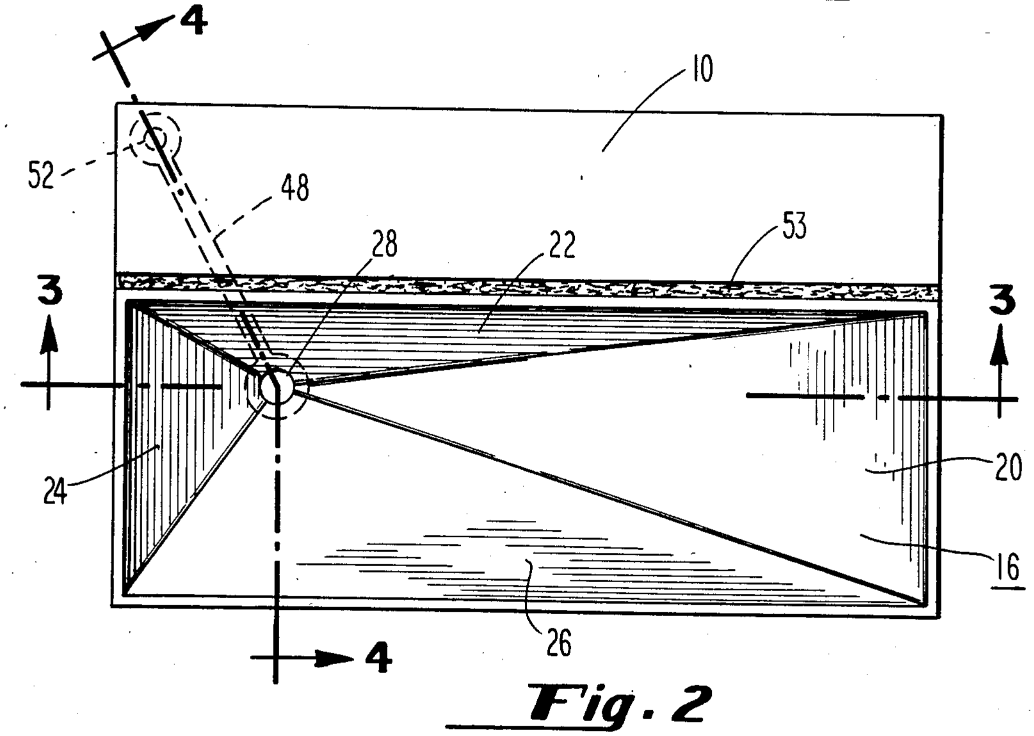
FIG. 2 is a plan view of the apparatus of FIG. 1.
Figure 3:
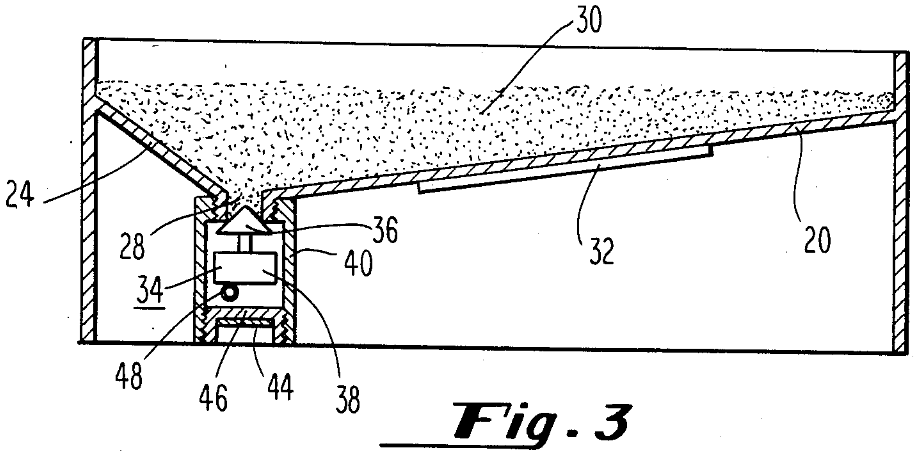
FIG. 3 is a sectional view taken along line 3—3 of FIG. 2.
Figure 4:
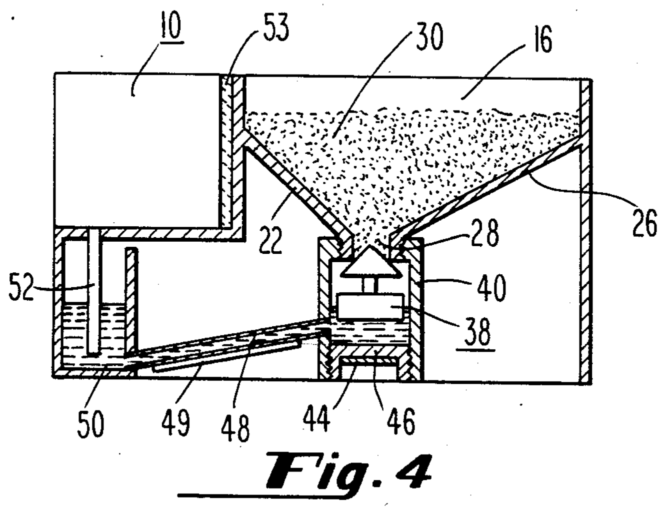
FIG. 4 is a sectional view of the apparatus of FIG. 2 taken along line 4—4.

Referring now to FIGS. 2 through 4, the bin 16 is shown as comprising a plurality of inclined surfaces 20, 22, 24 and 26. The inclined surfaces 20, 22, 24, and 26 lead to an outlet 28 from the bin 16.

In accordance with one important aspect of the invention, the particles of ink 30 located within the bin 16 are fluidized by a vibrator 32. The fluidization of the particles 30 under the influence of the inclined surfaces of the bin 16 allows the particles to move toward the outlet 28.

In accordance with another important aspect of the invention, the control of the particles 30 through the outlet 28 is achieved by means of a float valve 34. The float valve 34 includes a valve element 36 which cooperates with the outlet 28 so as to close the outlet when the level of ink supporting a floating section 38 is sufficiently high. In order to maintain the valve element 36 in appropriate alignment with the opening 28, a valve guide in the form of a cage 40 is provided. The cage 40 may be screwed onto a threaded extension 42 of the bin 16.

It will be appreciated that the particles 30 of ink flow into the cage 40 whereupon they are melted. This is accomplished by means of a heater 44 attached to a threaded metallic plug 46 at the base of the cage 40. A tube 48 heated by a heater 49 leading away from the area just above the cap 46 supplies a sump 50 shown in FIG. 4. The inlet 52 to the ink jet chambers comprises a pipe leading up to the printhead 10. As shown in FIGS. 2 and 4, an insulating barrier 53 is provided between the head 10 and the bin 16. This barrier permits the head 10 to be heated while the bin 16 remains sufficiently cool so that the hot melt ink is maintained in granular or particle form.

Figure 5:
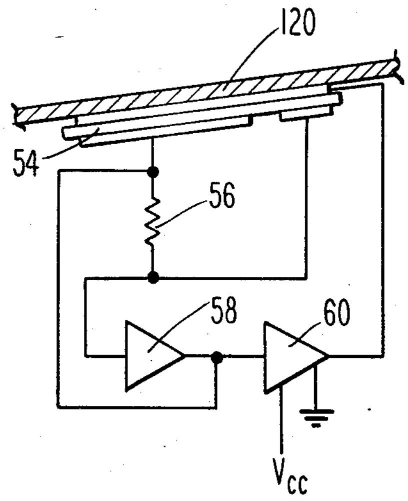
FIG. 5 is a schematic diagram of vibrator apparatus shown in FIG. 3.

Referring to FIG. 5, the inclined surface 20 of the bin 16 carries a bimorph vibrator 54. The bimorph vibrator 54 includes electrodes which are coupled to an oscillating circuit including a resistor 56 and two operational amplifiers 58 and 60.

Figure 6:
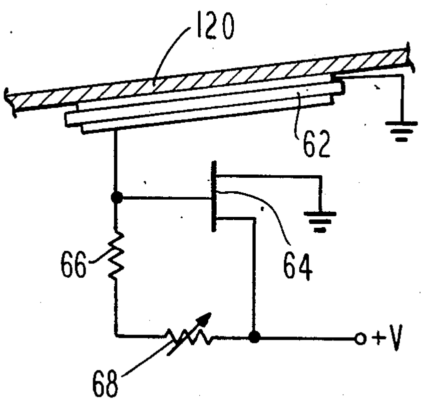
FIG. 6 is a schematic diagram of alternative vibrator apparatus which may be utilized in the embodiment of FIG. 3.

In FIG. 6, a vibrator is disclosed comprising a unimorph 62. One terminal of the unimorph 62 is connected to ground. The other terminal is coupled to an oscillator comprising an FET 64, a resistor 66 and a potentiometer 68.

Figure 7:
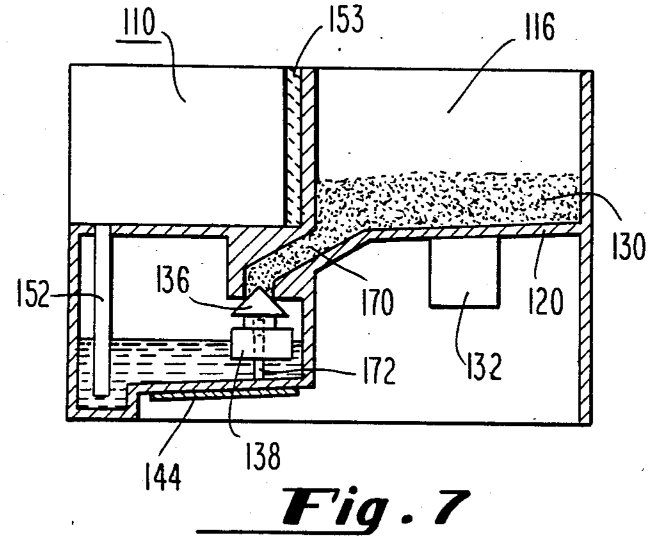
FIG. 7 is an alternative embodiment of the invention.

Referring to FIG. 7, another embodiment of the invention is disclosed. As shown there, the bin 116 is coupled to a sump 150 by a channel 170. A vibrator 132 is attached to an inclined surface 120, the base of the bin 116.

In the embodiment shown in FIG. 7, hot melt ink in granular or particle form is supplied directly to the sump through the channel 170 which is opened and closed in response to the level of the float valve 136. In order to control the position of the float valve 136 in alignment with the channel 170, a guide 172 in the form of a pin extends vertically downward and toward the base of the sump 150. The base of the sump 150 also includes a heater 144. Liquid ink which is melted by the heater 144 is allowed to flow upwardly through the inlet pipe 152 to the printhead 110. An insulating barrier 153 is provided between the bin 132 and the head 110.

As described in the foregoing embodiments of the invention, hot melt ink in granular or particle form is fluidized and then allowed to flow under the influence of gravity through the outlet of a bin. It has been found that hot melt ink should comprise sufficiently small particles so as to permit its fluidization. In this connection, it has been found that particles having a maximum cross-sectional dimension of 0.2 mm. are preferred.

In the above-discussed embodiments, only the heads 10 and 110 and the sumps 50 and 150 need to comprise a thermally conductive material with the exception of the cap 44 located at the base of the cage 40 as shown in FIG. 3. The remainder of the components may comprise plastic or other insulating materials such as Teflon or Ryton.

A particularly preferred ink for use in the flexible web is that disclosed in U.S. Pat. No. 4,390,369 and pending U.S. patent applications Ser. No. 610,627, filed May 16, 1984, Ser. No. 565,524, filed Dec. 23, 1983 and Ser. No. 644,542, filed Aug. 27, 1984, all of which are assigned to the assignee of this invention and incorporated herein by reference.

Various details of a suitable ink jet head 10 of the type shown in FIGS. 1 and 2 are set forth in copending application Ser. No. 576,582, filed Feb. 3, 1984, as well as U.S. Pat. No. 4,459,601 and copending application Ser. No. 661,794, filed Oct. 17, 1984, which are assigned to the assignee of this invention and incorporated herein by reference.

Although preferred embodiments of the invention have been shown and described, it will be understood that various modifications may be made which will fall within the true spirit and scope of the invention as set forth in the appended claims.

I claim:

1. A hot melt ink jet apparatus comprising:
- an ink jet chamber including an inlet and an orifice for ejecting droplets of ink;
- a bin including an outlet for storing hot melt ink in particle form;

- means for advancing said particles in said bin toward said outlet including vibration means for fluidizing said particles; and
- a melting area coupled to said outlet for melting said particles and supplying melted ink to said inlet of said chamber.

2. The apparatus of claim 1 wherein said means for advancing includes at least one inclined surface leading to said outlet.

3. The apparatus of claim 2 wherein said outlet is located at the base of said bin.

4. The apparatus of claim 1 including means for controlling the flow of said ink particles through said outlet.

5. The apparatus of claim 4 wherein said means for controlling comprises a float valve floating at said melting area and adapted to close said outlet.

6. The apparatus of claim 5 wherein said means for controlling further comprises guide means for guiding said float valve into and out of said outlet.

7. The apparatus of claim 1 including a cartridge adapted to be placed above and in communication with said bin, said cartridge including a removable base.

8. The apparatus of claim 1 wherein said cartridge includes a track and said removable base is adapted to slide in to and out of said track.

9. A hot melt ink jet apparatus comprising:
- an ink jet chamber including an inlet and an orifice for ejecting droplets of ink;
- storage means including an outlet for storing hot melt ink in particle form;
- a melting area coupled to said outlet for melting said particles and supplying melted ink to said inlet of said chamber,
- means for controlling the flow of ink particles through said outlet including a float valve floating in the melted ink and adapted to close said outlet in response to the level of ink in said melting area.

10. The apparatus of claim 9 wherein said storage means comprises a bin.

11. The apparatus of claim 10 wherein said bin includes at least one enclosed surface leading to said outlet.

12. The apparatus of claim 11 wherein said outlet is located at the base of said bin.

13. The apparatus of claim 9 including a cartridge adapted to be placed above and in communication with said storage means, said cartridge including a removable base.

14. The apparatus of claim 13 wherein said cartridge includes a track and said removable base is adapted to slide in to and out of said track.

15. A method of operating a hot melt ink jet apparatus comprising the following steps:
- storing particles of hot melt ink;
- fluidizing the particles by vibration;
- advancing the fluidized particles toward a melting location; and
- melting the particles at the melting location.

16. The method of claim 15 wherein the particles are advanced under the influence of gravity.

17. The method of claim 15 wherein said particles have a maximum cross-sectional dimension of 0.2 mm.

* * * * *